US009924008B2

(12) United States Patent
Imanaka et al.

(10) Patent No.: US 9,924,008 B2
(45) Date of Patent: Mar. 20, 2018

(54) INFORMATION PROCESSING DEVICE AND INFORMATION PROCESSING METHOD

(71) Applicant: Mitsubishi Electric Corporation, Tokyo (JP)

(72) Inventors: Hideo Imanaka, Tokyo (JP); Masato Hirai, Tokyo (JP); Atsushi Shimada, Tokyo (JP); Reiko Sakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/109,547

(22) PCT Filed: Feb. 7, 2014

(86) PCT No.: PCT/JP2014/052912
§ 371 (c)(1),
(2) Date: Jul. 1, 2016

(87) PCT Pub. No.: WO2015/118661
PCT Pub. Date: Aug. 13, 2015

(65) Prior Publication Data
US 2016/0344853 A1    Nov. 24, 2016

(51) Int. Cl.
*G06F 3/048* (2013.01)
*H04M 1/247* (2006.01)
(Continued)

(52) U.S. Cl.
CPC ........ *H04M 1/2477* (2013.01); *G06F 3/0482* (2013.01); *G06F 3/04817* (2013.01); *G06T 11/001* (2013.01)

(58) Field of Classification Search
CPC ............. G06F 3/04817; G06F 3/04842; G06F 3/0482; G06F 3/0488
See application file for complete search history.

(56) References Cited

U.S. PATENT DOCUMENTS

2003/0013493 A1    1/2003    Irimajiri et al.
2004/0001105 A1*   1/2004    Chew ................ H04M 1/72583
                                                         715/817
(Continued)

FOREIGN PATENT DOCUMENTS

JP    8-255067 A    10/1996
JP    2001-308991 A    11/2001
(Continued)

OTHER PUBLICATIONS

International Search Report issued in PCT/JP2014/052912, dated May 20, 2014.

*Primary Examiner* — Nicholas Augustine
(74) *Attorney, Agent, or Firm* — Birch, Stewart, Kolach & Birch, LLP

(57) ABSTRACT

It is configured that, when an operation of selecting a type is accepted by an operation acceptance processing unit 8, an item re-selection unit 9 re-selects one or multiple information processing items from among information processing items that are included in a plurality of information processing items stored in an information-processing item storage unit 2, and are information processing items of the type for which the operation of selecting is accepted, except for an information processing item already displayed on a liquid-crystal display 6.

4 Claims, 8 Drawing Sheets

(51) Int. Cl.
*G06F 3/0482* (2013.01)
*G06F 3/0481* (2013.01)
*G06T 11/00* (2006.01)
*G06F 3/01* (2006.01)

(56) References Cited

U.S. PATENT DOCUMENTS

| | | | |
|---|---|---|---|
| 2005/0108657 A1* | 5/2005 | Han | G06F 3/04817 715/827 |
| 2008/0216022 A1* | 9/2008 | Lorch | G06F 3/04817 715/847 |
| 2009/0125842 A1* | 5/2009 | Nakayama | G06F 3/0482 715/835 |
| 2009/0172597 A1* | 7/2009 | Mercer | G06F 3/0488 715/840 |
| 2009/0327963 A1* | 12/2009 | Mouilleseaux | G06F 3/04883 715/834 |
| 2011/0060988 A1* | 3/2011 | Mysliwy | G06F 3/04817 715/702 |
| 2011/0202879 A1* | 8/2011 | Stovicek | G06F 3/0482 715/828 |

FOREIGN PATENT DOCUMENTS

| | | |
|---|---|---|
| JP | 2002-140144 A | 6/2002 |
| JP | 2003-140797 A | 5/2003 |
| JP | 2008-40957 A | 2/2008 |
| JP | 2008-84323 A | 4/2008 |
| JP | 2008-140339 A | 6/2008 |

* cited by examiner

▲ Icon Indicative of Navigation-Related Information Processing Item
☏ Icon Indicative of Telephone-Related Information Processing Item

INFORMATION PROCESSING DEVICE AND INFORMATION PROCESSING METHOD

TECHNICAL FIELD

The present invention relates to an information processing device and an information processing method for displaying as a list, information processing items, each being an item of executable information processing, to thereby accept an operation of selecting the information processing item to be executed.

BACKGROUND ART

The following Patent Document 1 discloses an information processing device by which, at the time of displaying different types of plural menus (menus related to information processing items: for example, a telephone and a mail) on a display unit, the menus are displayed in different colors for each of the types in order for a user to easily select his/her desired menu.

The following Patent Document 2 discloses an information processing device by which menus are displayed in different colors for each of the types, as well as operation keys with colors same as those of the menus are provided, so that the desired menu can be easily and surely selected.

CITATION LIST

Patent Document

Patent Document 1: Japanese Patent Application Laid-open No. 2002-140144 (for example, Paragraph [0008])
Patent Document 2: Japanese Patent Application Laid-open No. H08-255067 (for example, Paragraph [0006])

SUMMARY OF THE INVENTION

Problems to be Solved by the Invention

Since the conventional information processing devices are configured as described above, the menus as information processing items are displayed in different colors; however, at the time of displaying a plurality of information processing items on a display, due to the size of the display and restrictions related to user's recognition, etc., the number of the information processing items that are displayable at a time is limited. Thus, when a lot of information processing items exist, there is a case where all of the information processing items cannot be displayed at a time. In such a case, a desired information processing item is not displayed unless the user repeats an operation, such as scrolling, paging or the like, thus causing a problem of taking a lot of trouble and time, or likewise.

This invention has been made to solve the problem as described above, and an object thereof is to provide an information processing device and an information processing method by which a desired information processing item can be displayed with reduced operations even if a lot of information processing items exist.

Means for Solving the Problems

An information processing device according to the invention comprises: an item storage in which a plurality of information processing items, each being an item of executable information processing, are stored; a prioritization processor that specifies priorities of the plurality of information processing items stored in the item storage; an item selector that selects from among the plurality of information processing items stored in the item storage, one or multiple information processing items, on the basis of the priorities specified by the prioritization processor; an item display processor that displays the one or multiple information processing items selected by the item selector; and an operation acceptor that accepts an operation of selecting one of types about the information processing items stored in the item storage; wherein, when the operation of selecting the type is accepted by the operation acceptor, the item selector re-selects one or multiple information processing items from among information processing items that are included in the plurality of information processing items stored in the item storage, and that are information processing items of the type for which the operation of selecting is accepted, except for an information processing item already displayed by the item display processor.

Effect of the Invention

According to the invention, the item selector is configured to re-select, when the operation of selecting the type is accepted by the operation acceptor, one or multiple information processing items from among information processing items that are included in the plurality of information processing items stored in the item storage, and that are information processing items of the type for which the operation of selecting is accepted, except for an information processing item already displayed by the item display processor. Thus, there is an effect that a desired information processing item can be displayed with reduced operations even if a lot of information processing items exist.

MODES FOR CARRYING OUT THE INVENTION

Embodiment 1

In Embodiment 1, it is assumed that an information processing device is applied to an in-vehicle information device for automobile (for example, car-navigation device); however, this is just an example, and the information processing device may be applied similarly to an information terminal device, for example, a mobile PC, a smartphone, a mobile phone or the like.

Figure 1:
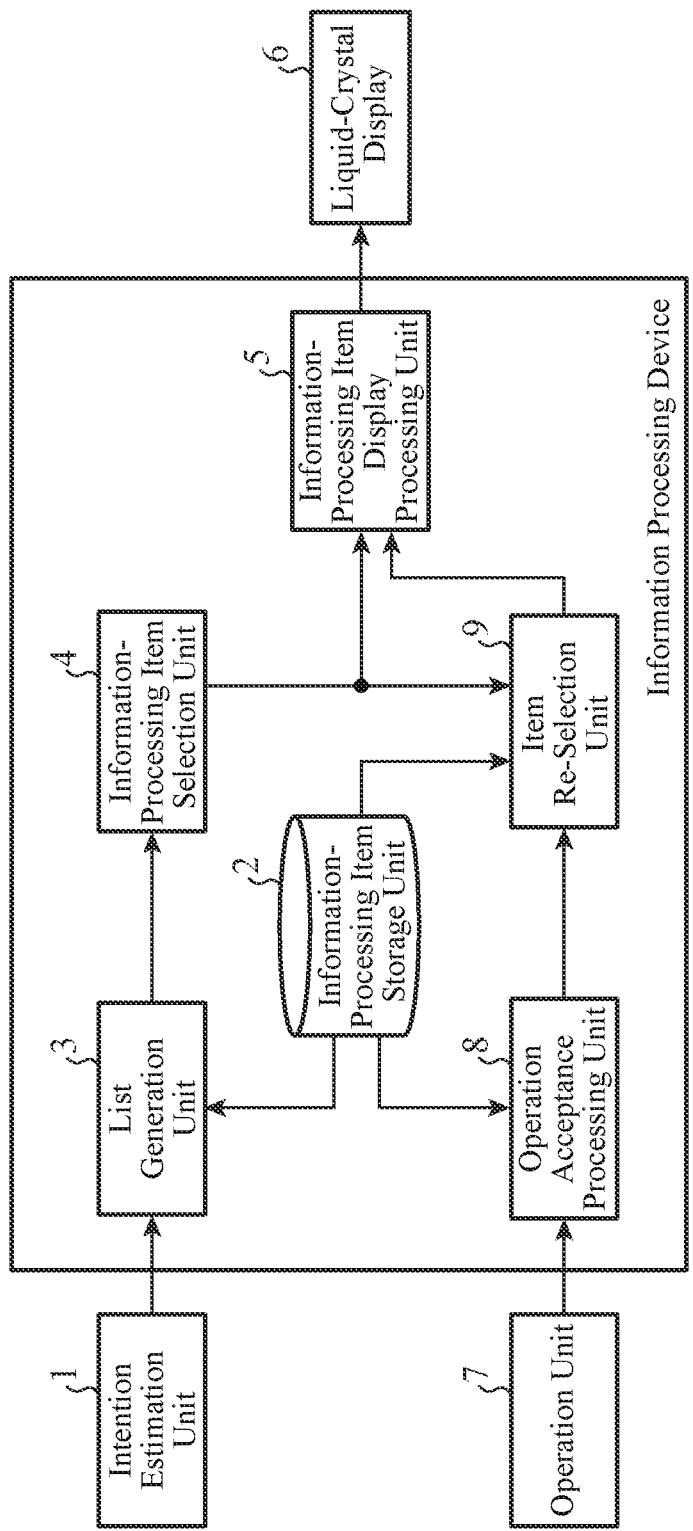
FIG. 1 is a configuration diagram showing an information processing device according to Embodiment 1 of the invention.

FIG. 1 is a configuration diagram showing an information processing device according to Embodiment 1 of the invention.

In FIG. 1, an intention estimation unit 1 is a processing unit installed, for example, in an in-vehicle information device for automobile, and executes calculation processing of a probability that an information processing item that is an item of executable information processing in the in-vehicle information device for automobile (for example, a navigation-related item, a telephone-related item, an audio-related item, an air conditioner-related item, etc.) is selected by a user, in consideration of a past operational condition of the user and the like.

An information-processing item storage unit 2 is configured with a storage device, for example, a RAM, a hard disk, or the like, in which a plurality of information processing items with respect to the in-vehicle information device for automobile are stored. Note that the information-processing item storage unit 2 constitutes an item storage.

A list generation unit 3 is configured, for example, with a semiconductor integrated circuit on which a CPU is mounted, a one-chip microcomputer, or the like, and executes: specifying priorities of the plurality of information processing items stored in the information-processing item storage unit 2 on the basis of their probabilities calculated by the intention estimation unit 1; and processing of generating a list of the information processing items lined up in order according to that priorities. Note that the list generation unit 3 constitutes a prioritization processor.

An information-processing item selection unit 4 is configured, for example, with a semiconductor integrated circuit on which a CPU is mounted, a one-chip microcomputer, or the like, and executes processing of selecting one or multiple information processing items from among the plurality of information processing items included in the list generated by the list generation unit 3, on the basis of their priorities. For example, the information-processing item selection unit 4 just has to execute processing of selecting a high-order specified number of (for example, three) information processing items with higher priorities, from among the plurality of information processing items included in the list, and the same also applies to in the following description.

An information-processing item display processing unit 5 is configured, for example, with a GPU (Graphics Processing Unit) or the like, and executes processing of displaying the high-order specified number of information processing items selected by the information-processing item selection unit 4 or an item re-selection unit 9, on a liquid-crystal display 6 of the in-vehicle information device for automobile. Note that the information-processing item display processing unit 5 constitutes an item display processor.

Here, a case is shown where the information-processing item display processing unit 5 displays the information processing items on the liquid-crystal display 6 of the in-vehicle information device for automobile; however, it is allowable that the information-processing item display processing unit 5 outputs information indicative of the information processing items to the in-vehicle information device for automobile, so that a display processing unit (not shown) of the in-vehicle information device for automobile displays the information processing items on the liquid-crystal display 6 according to the information indicative of the information processing items outputted from the information-processing item display processing unit 5.

An operation acceptance processing unit 8 is configured, for example, with a semiconductor integrated circuit on which a CPU is mounted, a one-chip microcomputer, or the like, which is a processing unit that accepts a content of operation through an operation unit 7 (for example, a press-down switch, a touch panel incorporated in the liquid-crystal display 6, or the like) installed in the in-vehicle information device for automobile.

Namely, the operation acceptance processing unit 8 executes processing of accepting an operation of selecting an information processing item to be executed from among the information processing items displayed on the liquid-crystal display 6 by the information-processing item display processing unit 5.

Further, the operation acceptance processing unit 8 executes processing of accepting an operation of selecting one of types (for example, Navigation, Telephone, Audio, Air-Conditioner, and the like) about the information processing items stored in the information-processing item storage unit 2. Note that the operation acceptance processing unit 8 constitutes an operation acceptor.

The item re-selection unit 9 is configured, for example, with a semiconductor integrated circuit on which a CPU is mounted, a one-chip microcomputer, or the like, and when the operation of selecting the type is accepted by the operation acceptance processing unit 8, executes processing of extracting information processing items of the type for which the operation of selecting is accepted, from among the plurality of information processing items stored in the information-processing item storage unit 2.

Further, the item re-selection unit 9 executes processing of eliminating an information processing items already displayed on the liquid-display 6 by the information-processing item display processing unit 5, from among the information processing items after the extraction processing (information processing items of the type for which the operation of selecting is accepted), followed by executing processing of selecting one or multiple information processing items from among the information processing items after the elimination processing, to thereby output the thus-selected information processing items to the information-processing item display processing unit 5. As the information processing items to be selected, the item re-selection unit 9 can select, for example, one or multiple information processing items on the basis of the priorities specified by the list generation unit 3. Instead, the item re-selection unit 9 may select, for example, the high-order specified number of (for example, three) information processing items with higher priorities specified by the list generation unit 3, and this also applies to in the following description.

Note that an item selector is constituted by the information-processing item selection unit 4 and the item re-selection unit 9.

In the case of FIG. 1, it is assumed that the information-processing item storage unit 2, the list generation unit 3, the information-processing item selection unit 4, the information-processing item display processing unit 5, the operation acceptance processing unit 8 and the item re-selection unit 9, that are configuration elements of the information processing device, are each configured by special hardware; however, the information processing device may be configured by a computer.

In the case where the information processing device is configured by a computer, it suffices: to establish the information-processing item storage unit 2 on an internal memory or external memory of the computer; to store in the memory of the computer, the programs in which processing contents of the list generation unit 3, the information-processing item selection unit 4, the information-processing item display processing unit 5, the operation acceptance processing unit 8 and the item re-selection unit 9 are described; and to cause a CPU of the computer to execute the programs stored in the memory.

Figure 2:
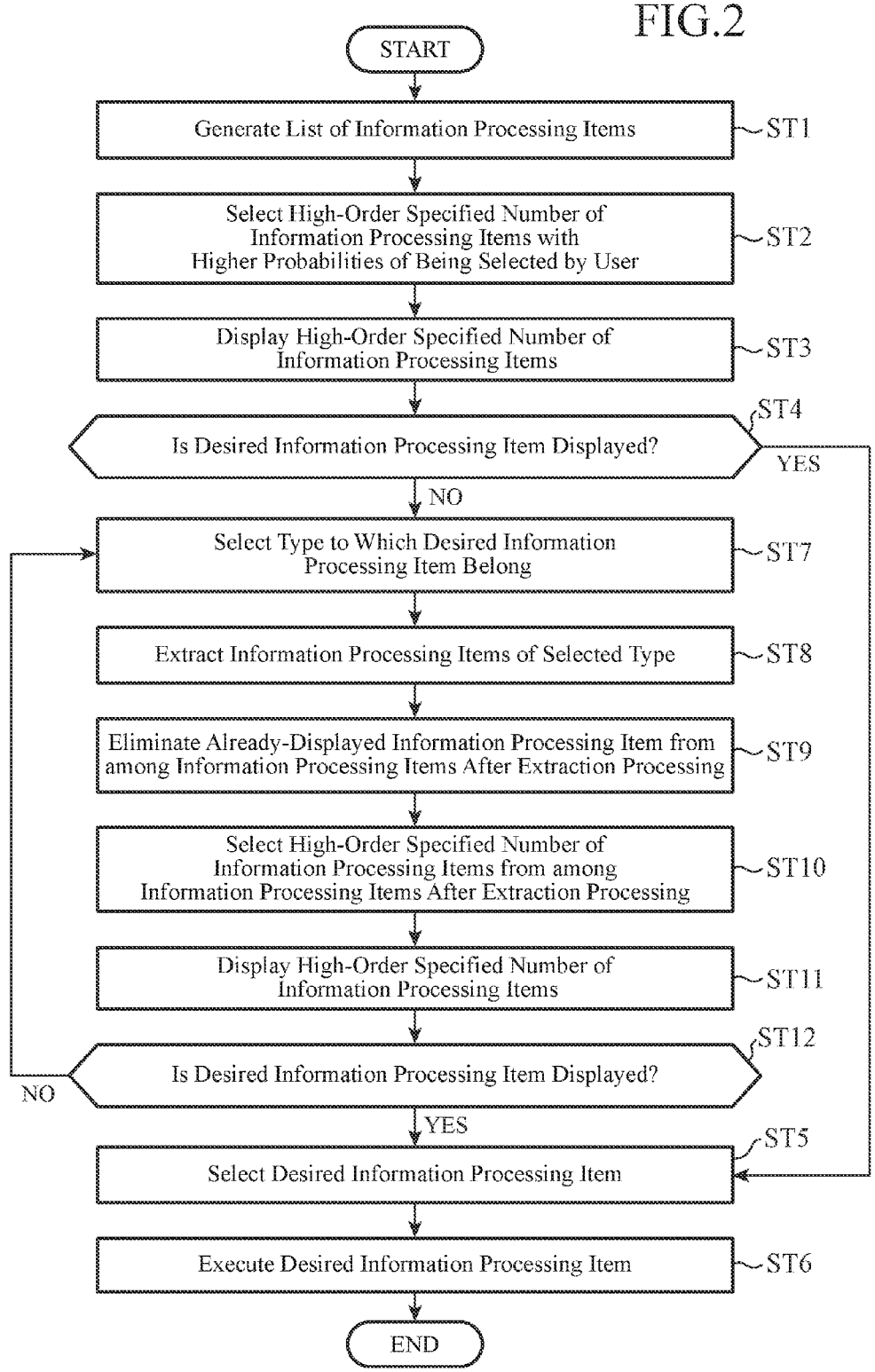
FIG. 2 is a flowchart showing processing contents (information processing method) by the information processing device according to Embodiment 1 of the invention.

FIG. 2 is a flowchart showing the processing contents (information processing method) by the information processing device according to Embodiment 1 of the invention.

Next, operations will be described.

In Embodiment 1, for convenience of description, the types of information processing items stored in the information-processing item storage unit 2 are assumed to be four types of Navigation, Telephone, Audio and Air-Conditioner.

Further, it is assumed that, in the information-processing item storage unit 2, "NAVI 1", "NAVI 2" . . . are stored as navigation-related information processing items; "TEL 1", "TEL 2" . . . are stored as telephone-related information processing items; "AUDIO 1", "AUDIO 2" . . . are stored as audio-related information processing items; and "A/C 1", "A/C 2" . . . are stored as air conditioner-related information processing items.

First, the intention estimation unit 1 installed in the in-vehicle information device for automobile calculates for each of the plurality of information processing items with respect to the in-vehicle information device for automobile, a probability that it is selected by the user, in consideration of a past operational condition of the user and the like.

Because calculation processing of the probability of being selected by the user is itself a publicly known technique, its detailed description is omitted here; however, for example, the following calculation processing is conceivable: in the case where the number of past executions of the plurality of information processing items are compared with each other, as the number of the executions of the information processing item becomes larger, the probability thereof to be selected by the user is made higher.

When the intention estimation unit 1 calculates each probability of being selected by the user, the list generation unit 3 executes specifying priorities of the plurality of information processing items stored in the information-processing item storage unit 2 on the basis of their probabilities of being selected by the user, to thereby generate a list of the information processing items lined up in order according to those priorities (Step ST1).

Namely, the list generation unit 3 gives a higher priority to the information processing item as its probability of being selected by the user becomes higher, to thereby generate the list of the information processing items in descending order of priority.

Figure 3:
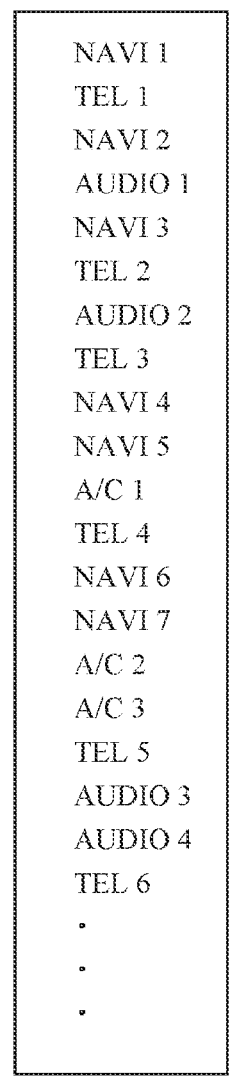
FIG. 3 is an illustration diagram showing an example of a list of information processing items generated by a list generator 3.

Here, FIG. 3 is an illustration diagram showing an example of the list of the information processing items generated by the list generation unit 3.

In FIG. 3, the example is shown in which the information processing item with the highest probability of being selected by the user is "NAVI 1", the information processing item with the next highest probability is "TEL 1", and the information processing item with the further next highest probability is "NAVI 2".

When the list generation unit 3 generates the list of the information processing items, the information-processing item selection unit 4 selects the high-order specified number of (for example, three) information processing items with higher priorities, from among the plurality of information processing items included in the list (Step ST2).

In the case where the list of FIG. 3 is generated, if the high-order specified number is set, for example, to three, the information processing items of "NAVI 1", "TEL 1" and "NAVI 2" are selected.

When the information-processing item selection unit 4 selects the high-order specified number of information processing items with higher probabilities of being selected by the user, the information-processing item display processing unit 5 displays the high-order specified number of information processing items on the liquid-crystal display 6 of the in-vehicle information device for automobile (Step ST3).

Figure 4:
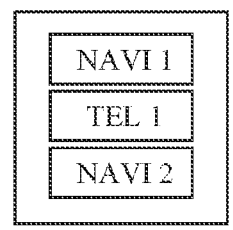
FIG. 4 is an illustration in which a display example of information processing items is shown.

FIG. 4 is an illustration in which a display example of the information processing items is shown. In the example of FIG. 4, the information processing items of "NAVI 1", "TEL 1" and "NAVI 2" are displayed.

The user confirms the information processing items displayed on the liquid-crystal display 6, and if his/her desired information processing item to be executed is displayed (Step ST4), operates the operation unit 7 installed in the in-vehicle information device for automobile to thereby select the desired information processing item.

In the example of FIG. 4, the information processing item of "NAVI 1", "TEL 1" or "NAVI 2" can be selected.

When the user operates the operation unit 7 to thereby select the desired information processing item to be executed, the operation acceptance processing unit 8 accepts the operation of selecting that information processing item, and instructs the in-vehicle information device for automobile to execute that information processing item (Step ST5).

Accordingly, the information processing item selected by the user is executed by the in-vehicle information device for automobile (Step ST6).

When the user confirms the information processing items displayed on the liquid-crystal display 6, if his/her desired information processing item to be executed is not displayed (Step ST4), the user operates the operation unit 7 installed in the in-vehicle information device for automobile to thereby select the type of that information processing item (Navigation, Telephone, Audio or Air-Conditioner) stored in the information-processing item storage unit 2.

When the user operates the operation unit 7 to thereby select the type of the information processing item, the operation acceptance processing unit 8 accepts the operation of selecting the type of that information processing item and, then informs the item re-selection unit 9 of that type (Step ST7).

Upon receiving the information of the type selected by the user from the operation acceptance processing unit 8, the item re-selection unit 9 extracts information processing items of that type from the plurality of information processing items stored in the information-processing item storage unit 2 (Step ST8).

For example, the type selected by the user is Navigation, "NAVI 1", "NAVI 2" . . . are extracted as the navigation-related information processing items.

Instead, the type selected by the user is Telephone, "TEL 1", "TEL 2" . . . are extracted as the telephone-related information processing items.

Figure 5:
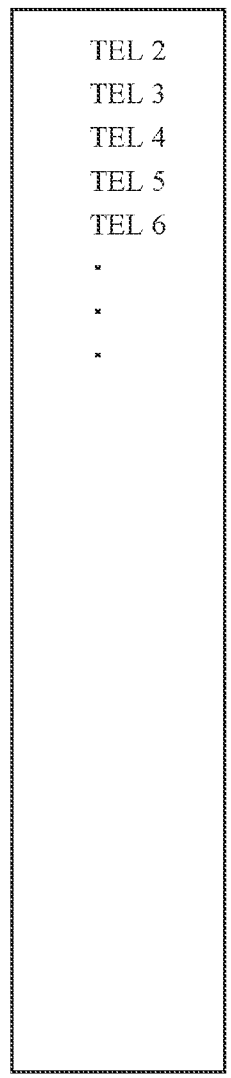
FIG. 5 is an illustration diagram showing an extraction example of information processing items of a type accepted through its selecting operation.

FIG. 5 is an illustration diagram showing an extraction example of the information processing items of the type accepted through its selecting operation. In the example of FIG. 5, the telephone-related information processing items of "TEL 1", "TEL 2" . . . are being extracted.

Upon executing the processing of extracting the information processing items of the type accepted through the selecting operation, the item re-selection unit 9 executes processing of eliminating an information processing item already displayed on the liquid-display 6 by the information-processing item display processing unit 5, from among the information processing items after the extraction processing (Step ST9).

For example, in the case where the information processing items of "NAVI 1", "TEL 1" and "NAVI 2" are displayed as shown in FIG. 4, when the telephone-related information processing items of "TEL 1", "TEL 2" . . . are extracted, because the information processing item "TEL 1" is an information processing item already displayed on the liquid-crystal display 6, the information processing item "TEL 1" is eliminated from the telephone-related information processing items of "TEL 1", "TEL 2" . . . .

Here, the information processing item "TEL 1" is eliminated, so that the information processing items become "TEL 2", "TEL 3" . . . after the elimination processing.

Upon executing the processing of eliminating the information processing items already displayed on the liquid-crystal display 6, the item re-selection unit 9 selects the high-order specified number of (for example, three) information processing items with higher priorities specified by the list generation unit 3, from among the information processing items after the elimination processing (Step ST10).

When the item re-selection unit 9 selects the high-order specified number of information processing items, the information-processing item display processing unit 5 displays the high-order specified number of information processing items on the liquid-crystal display 6 of the in-vehicle information device for automobile (Step ST11).

Figure 6:
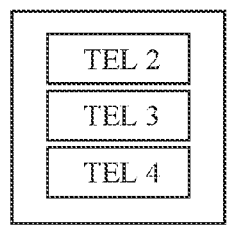
FIG. 6 is an illustration in which a display example of information processing items is shown.

FIG. 6 is an illustration in which a display example of the information processing items is shown. In the example of FIG. 6, the information processing items of "TEL 2", "TEL 3" and "TEL 4" are being displayed.

The user confirms the information processing items displayed on the liquid-crystal display 6, and if his/her desired information processing item to be executed is displayed (Step ST12), operates the operation unit 7 installed in the in-vehicle information device for automobile to thereby select the desired information processing item.

In the example of FIG. 6, the information processing item of "TEL 2", "TEL 3" or "TEL 4" can be selected.

When the user operates the operation unit 7 to thereby select the desired information processing item to be executed, the operation acceptance processing unit 8 accepts the operation of selecting that information processing item, and instructs the in-vehicle information device for automobile to execute that information processing item (Step ST5).

Accordingly, the information processing item selected by the user is executed by the in-vehicle information device for automobile (Step ST6).

When the user confirms the information processing items displayed on the liquid-crystal display 6, if his/her desired information processing item to be executed is not displayed (Step ST12), processing from Steps ST7 to ST12 is executed repeatedly until the desired information processing item is displayed.

For example, when Telephone is selected as a type of information processing item through the operation of the operation unit 7 installed in the in-vehicle information device for automobile, because the information processing items of "TEL 1" to "TEL 4" are already displayed on the liquid-crystal display 6, the information processing items after the elimination processing by the item re-selection unit 9 become "TEL 5", "TEL 6" . . . .

Figure 7:
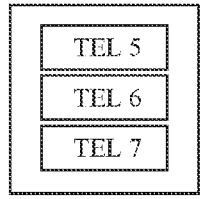
FIG. 7 is an illustration in which a display example of information processing items is shown.

Thus, the information processing items of "TEL 5", "TEL 6" and "TEL 7" are displayed as shown in FIG. 7.

Figure 8:
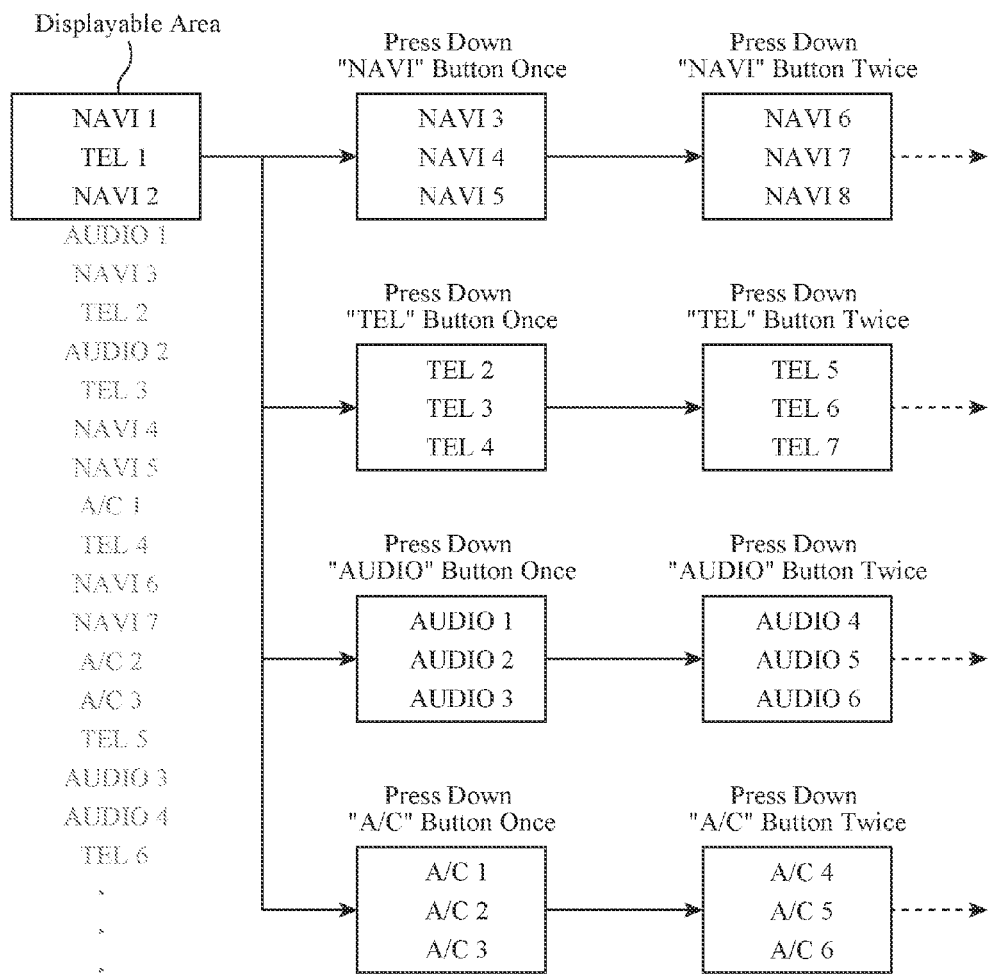
FIG. 8 is an illustration diagram showing examples in each of which information processing items to be displayed are changed through an operation of selecting a type of information processing item.

Here, FIG. 8 is an illustration diagram showing examples in each of which the information processing items to be displayed are changed through an operation of selecting the type of information processing item.

In the examples of FIG. 8, when the desired information processing item to be executed is "AUDIO 5", if Audio is selected twice as the type of information processing item, the information processing item "AUDIO 5" is displayed.

Further, when the desired information processing item to be executed is "A/C 3", if Air-Conditioner is selected once as the type of information processing item, the information processing item "A/C 3" is displayed.

As is apparent from the above, according to Embodiment 1, the item re-selection unit 9 is configured to re-select, when the operation of selecting the type is accepted by the operation acceptance processing unit 8, the high-order specified number of information processing items with higher priorities specified by the list generation unit 3, from among information processing items that are included in the plurality of information processing items stored in the information-processing item storage unit 2, and are information processing items of the type for which the operation of selecting is accepted, except for an information processing item already displayed on the liquid-crystal display 6. Thus, an effect is achieved that a desired information processing item can be displayed with reduced operations even if a lot of information processing items exist.

Embodiment 2

Figure 9:
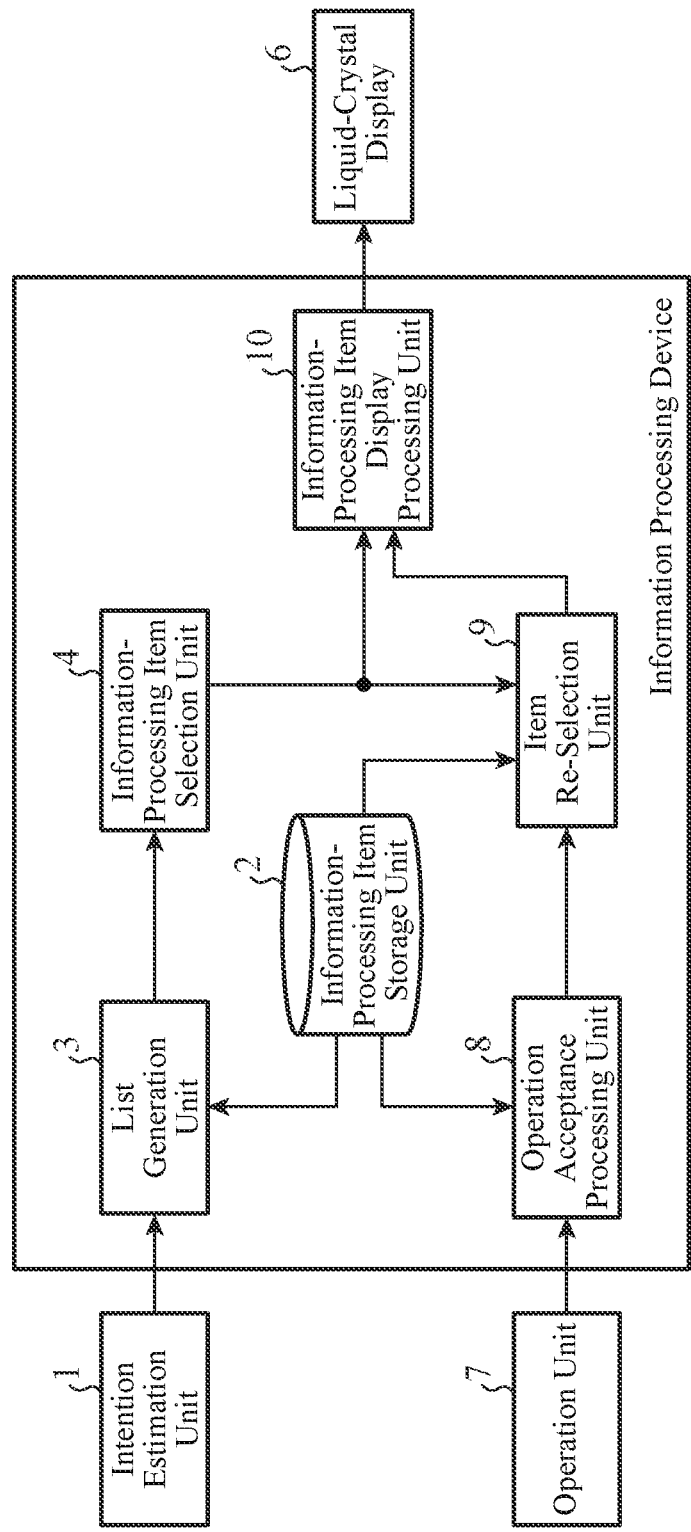
FIG. 9 is a configuration diagram showing an information processing device according to Embodiment 2 of the invention.

FIG. 9 is a configuration diagram showing an information processing device according to Embodiment 2 of the invention, and in the figure, the same reference numerals as in FIG. 1 represent the same or equivalent parts, so that their description is omitted here.

An information-processing item display processing unit 10 is configured, for example, with a GPU (Graphics Processing Unit) or the like, and, like the information-processing item display processing unit 5 in FIG. 1, executes processing of displaying the high-order specified number of information processing items selected by the information-processing item selection unit 4 or the item re-selection unit 9, on the liquid-crystal display 6 of the in-vehicle information device for automobile.

However, at the time of displaying the high-order specified number of information processing items on the liquid-crystal display 6 of the in-vehicle information device for automobile, the information-processing item display processing unit 10 identifies the respective types of the information processing items selected by the information-processing item selection unit 4 or the item re-selection unit 9, and displays the information processing items in display forms different for each of the types.

That is, the information-processing item display processing unit 10 displays the information processing items selected by the information-processing item selection unit 4 or the item re-selection unit 9, in different colors for each of the types of the information processing items. Note that the information-processing item display processing unit 10 constitutes the item display processor.

Here, a case is shown where the information-processing item display processing unit 10 displays the information processing items on the liquid-crystal display 6 of the in-vehicle information device for automobile; however, it is allowable that the information-processing item display processing unit 10 outputs information indicative of the information processing items to the in-vehicle information device for automobile, so that a display processing unit (not shown) of the in-vehicle information device for automobile displays the information processing items on the liquid-crystal display 6 according to the information indicative of the information processing items outputted from the information-processing item display processing unit 10.

In the case of FIG. 9, it is assumed that the information-processing item storage unit 2, the list generation unit 3, the information-processing item selection unit 4, the information-processing item display processing unit 10, the operation acceptance processing unit 8 and the item re-selection unit 9, that are configuration elements of the information processing device, are each configured by special hardware; however, the information processing device may be configured by a computer.

In the case where the information processing device is configured by a computer, it suffices: to establish the information-processing item storage unit 2 on an internal memory or external memory of the computer; to store in the memory of the computer, the programs in which processing contents of the list generation unit 3, the information-processing item selection unit 4, the information-processing item display processing unit 10, the operation acceptance processing unit 8 and the item re-selection unit 9 are written; and to cause a CPU of the computer to execute the programs stored in the memory.

Next, operation will be described.

According to Embodiment 2, it differs from Embodiment 1 only in the processing content at the time the information-processing item display processing unit 10 displays the high-order specified number of information processing items on the liquid-crystal display 6.

Namely, in Embodiment 1, at the time of displaying the high-order specified number of information processing items on the liquid-crystal display 6, the information-processing item display processing unit 5 displays them in the same color even if the high-order specified number of information processing items are of mixed types.

In contrast, in order to make it easy to discriminate the types of information processing items being displayed, the information-processing item display processing unit 10 is configured to identify the types of the high-order specified number of information processing items selected by the information-processing item selection unit 4 or the item re-selection unit 9, and to display that information processing items in different colors for each of the types of the information processing items.

For example, when the following, for example, are set beforehand: "Green Color" for navigation-related information processing items, "Red Color" for telephone-related information processing items, "Blue Color" for audio-related information processing items, and "Purple Color" for air conditioner-related information processing items, the information-processing item display processing unit 10 displays, if the information processing items selected by the information-processing item selection unit 4 or the item re-selection unit 9 are the navigation-related information processing items, that information processing items in "Green Color", and displays, if the information processing items selected by the information-processing item selection unit 4 or the item re-selection unit 9 are the telephone-related information processing items, that information processing items in "Red Color".

Further, the information-processing item display processing unit displays, if the information processing items selected by the information-processing item selection unit 4 or the item re-selection unit 9 are the audio-related information processing items, that information processing items in "Blue Color", and displays, if the information processing items selected by the information-processing item selection unit 4 or the item re-selection unit 9 are the air conditioner-related information processing items, that information processing items in "Purple Color".

Here is shown the information-processing item display processing unit 10 that displays the information processing items selected by the information-processing item selection unit 4 or the item re-selection unit 9 in different colors for each of the types of the information processing items; however, it suffices that the information-processing item display processing unit displays the information processing items in display forms different for each of the types, and may display the information processing items each together with an icon indicative of its type, for example.

Figure 10:
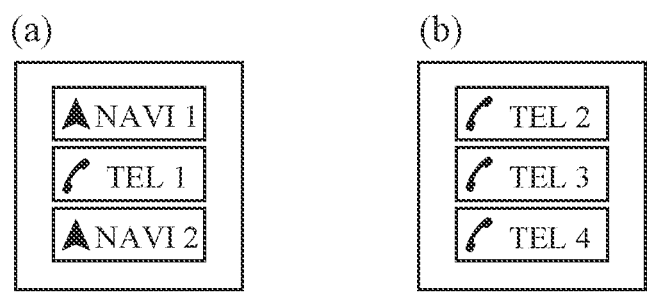
FIG. 10 is an illustration diagram showing examples in each of which information processing items are displayed together with icons indicative of types.

FIG. 10 is an illustration diagram showing examples in each of which information processing items are displayed together with icons indicative of their types.

Figure 11:
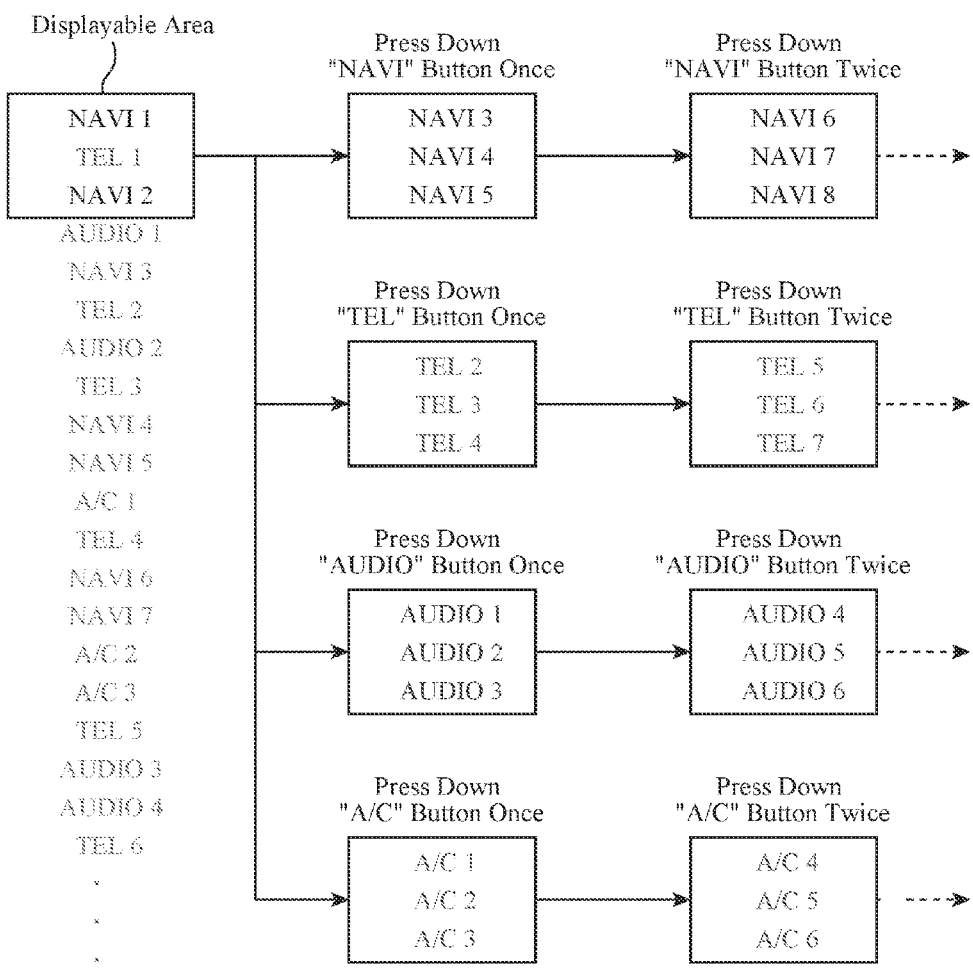
FIG. 11 is an illustration diagram showing examples in each of which information processing items to be displayed are changed through an operation of selecting a type of information processing item.

In this regard, FIG. 11 is an illustration diagram showing examples in each of which information processing items to be displayed are changed through an operation of selecting the type of information processing item.

In the examples of FIG. 11, for example, when the desired information processing item to be executed is "AUDIO 5", if Audio is selected twice as the type of information processing item, the information processing item "AUDIO 5" is displayed.

Further, when the desired information processing item to be executed is "A/C 3", if Air-Conditioner is selected once as the type of information processing item, the information processing item "A/C 3" is displayed.

Note that the navigation-related information processing items are displayed in "Green Color"; the telephone-related information processing items are displayed in "Red Color"; the audio-related information processing items are displayed in "Blue Color"; and the air conditioner-related information processing items are displayed in "Purple Color".

As is apparent from the above, according to Embodiment 2, the information-processing item display processing unit 10 is configured so that, at the time of displaying the high-order specified number of information processing items on the liquid-crystal display 6 of the in-vehicle information device for automobile, it identifies the types of the information processing items selected by the information-processing item selection unit 4 or the item re-selection unit 9, and displays the information processing items in display forms different for each of the types. Thus, an effect is achieved that the types of the information processing items being displayed can be identified easily and intuitively.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The information processing device according to the invention is suited as a device which is, at the time the information processing items each being an item of executable information processing are displayed as a list to thereby accept an operation of selecting an information processing item to be executed, highly needed to select the information processing item with a reduced number of operations.

DESCRIPTION OF REFERENCE NUMERALS AND SIGNS

1: intention estimation unit, 2: information-processing item storage unit (item storage), 3: list generation unit (prioritization processor), 4: information-processing item selection unit 4 (item selector), 5: information-processing item display processing unit (item display processor), 6: liquid-crystal display, 7: operation unit, 8: operation acceptance processing unit (operation acceptor), 9: item re-selection unit (item selector), 10: information-processing item display processing unit (item display processor).

The invention claimed is:

1. An in vehicle information device, comprising:
an item storage that stores a plurality of information processing items, each of which is an item of executable information processing and corresponds to a function of the in-vehicle information device;
an intention estimator that calculates a probability that each of the plurality of information processing items is selected by a user, in consideration of a past operational condition of the user;
a prioritization processor that specifies priorities of the plurality of information processing items stored in the item storage on the basis of the probability related to each of the plurality of information processing items calculated by the intention estimator;
an item selector that selects from among the plurality of information processing items stored in the item storage, a high-order specific number of information processing items, on the basis of the priorities specified by the prioritization processor;
an item display processor that displays the information processing items selected by the item selector; and
an operation acceptor that accepts an operation of selecting an information processing item to be executed from among the information processing items displayed by the item display processor and instructs the in-vehicle information device to execute the information processing item, and accepts an operation of selecting one of types of the information processing items stored in the item storage;
wherein, when the operation of selecting the type is accepted by the operation acceptor, the item selector re-selects a high-order specified number of information processing items from among information processing items that are included in the plurality of information processing items stored in the item storage, and that are information processing items of the identical type for which the operation of selecting is accepted, except for the information processing item already displayed by the item display processor.

2. The in vehicle information device of claim 1, wherein the item display processor identifies types of the information processing items selected by the item selector, and displays said information processing items in display forms different for each of the types.

3. The in vehicle information device of claim 2, wherein the item display processor displays the information processing items selected by the item selector in different colors for each of the types of said information processing items, or displays said information processing items each together with an icon indicative of its type.

4. An in vehicle information presentation method utilizing an item storage to store a plurality of information processing items, each of which is an item of executable information processing and corresponds to an in-vehicle function, the method, comprising:
determining the probability that each of the plurality of information processing items is selected by a user, in consideration of a past operational condition of the user;
prioritization processing, performed by a prioritization processor, to specify priorities of information processing items, each being an item of executable information processing, stored in the item store on the basis of the probability related to each of the plurality of information processing items as determined by the determining;
item-selection processing, performed by an item selector, to select from among the plurality of information processing items stored in the memory, a high order specific number of information processing items, on the basis of the priorities specified in the prioritization processing;
item display processing, performed by an item display processor, to display the information processing item selected in the item-selection processing; and
operation-acceptance processing, performed by an operation acceptor, to accept an operation of selecting an information processing item to be executed from among the information processing items displayed by the item display processing and instructs executing one of types of the information processing items stored in the item storage;
wherein, in the item-selection processing, when the operation of selecting the type is accepted in the operation-acceptance processing, a high order specified number of information processing items are re-selected from among information processing items that are included in the plurality of information processing items stored in the item storage, and that are information processing items of the identical type for which the operation of selecting is accepted, except for the information processing item already displayed in the item-display processing.

* * * * *